United States Patent
Camac

[11] 3,982,208
[45] Sept. 21, 1976

[54] CW SHOCK INITIATED HF/DF LASER
[75] Inventor: Morton Camac, Lexington, Mass.
[73] Assignee: Aerodyne Research Incorporated, Bedford, Mass.
[22] Filed: June 30, 1975
[21] Appl. No.: 591,603

[52] U.S. Cl. ............................ 331/94.5 G; 330/4.3
[51] Int. Cl.² .......................................... H01S 3/09
[58] Field of Search ............... 331/94.5; 330/4.3

[56] References Cited
UNITED STATES PATENTS

| | | | |
|---|---|---|---|
| 3,701,045 | 10/1972 | Bronfin et al. | 331/94.5 G |
| 3,818,374 | 6/1974 | Emanuel | 331/94.5 G |
| 3,832,650 | 8/1974 | Roberts | 331/94.5 G |

Primary Examiner—William L. Sikes
Attorney, Agent, or Firm—Frank A. Steinhilper; Alfred H. Rosen

[57] ABSTRACT

A continuous working chemical laser is disclosed. A primary gas such as hydrogen or deuterium is mixed with an activator for a secondary gas, and desirably with a buffer such as a noble gas. The primary gas mixture and a secondary gas such as fluorine are mixed at low temperature and subsequently a laser emitting chemical reaction is triggered. In one embodiment the gases are mixed in supersonic flow and the reaction is triggered by a shock wave. In another embodiment the reaction is triggered by external stimulation such as ultraviolet radiation or electric discharge or the like.

11 Claims, 4 Drawing Figures

CW SHOCK INITIATED HF/DF LASER

BACKGROUND OF THE INVENTION

Possibilities of hydrogen fluoride chemical lasers are both rather well known and quite frustrating. Atomic fluorine and molecular hydrogen react to form vibrationally excited HF, conventionally designated $HF^{++}$ and atomic hydrogen, represented by the reaction (conventionally designated the "cold" reaction):

$$F + H_2 \rightarrow HF^{++} + H$$

Atomic hydrogen and molecular fluorine react to form vibrationally excited HF and atomic fluorine (conventionally designated the "hot" reaction:

$$H + F_2 \rightarrow HF^{++} + F$$

In either case, the vibrational energy of $HF^{++}$ is a potential source of laser emission. The HF vibrational energy production in the cold reaction is considerably less than in the hot reaction.

To produce continuous working (CW) hydrogen fluoride lasers it has been the practice to employ the cold reaction, using hydrogen and dissociated fluorine. The efficiency for laser systems employing simultaneously both reactions, conventionally designated the chain reactions, is much less than systems utilizing only the cold reaction. However, based on the available vibrational energy, a laser system using the chain reactions can be several times more efficient, but an effective practical device has never been produced to utilize this result.

The present invention relates to a CW laser system in which the mixing of the two flows and the extraction of laser power are in separate regions. Mixing is carried out at greatly reduced temperatures such as about 100°K, and power is extracted at a later point after shock has resulted in increased temperature.

While it has not heretofore been possible to produce efficient CW laser emission using the energy available from the chain reactions, pulsed lasers utilizing the chain reaction, on the other hand, have been operable. For such pulsed lasers, the two chemicals hydrogen and fluorine, are mixed, usually in a buffer such as a noble gas, for example, helium, argon or the like, and are pulsed or triggered by suitable external initiation such as ultraviolet radiation.

Reactions with hydrogen and deuterium are for most purposes identical but because of the atomic difference some corresponding differences in result can be observed. In the case of lasers, for example, it is observed the emitted radiation from DF is significantly lower frequency than for HF, DF emission experiences less molecular absorption by the atmosphere. Accordingly, the present invention is disclosed with reference to hydrogen for purposes of simplicity, but it is to be understood that deuterium is the presently preferred form where transmission through air is important.

GENERAL NATURE OF THE INVENTION

The present invention comprises a continuous working (CW) chemical laser utilizing the chain reactions of hydrogen, or deuterium, with fluorine to produce vibrationally excited $HF^{++}$. A primary reagent, hydrogen, is mixed with a suitable buffer, such as helium, and with a chemical initiator for fluorine dissociation such as nitric oxide, and introduced at a moderate temperature into a primary flow region. The primary flow is accelerated to supersonic flow with an array of supersonic nozzles. A secondary reagent, fluorine, is separately introduced into the supersonic flow at the end of the nozzles. The primary and secondary flows intermix in the supersonic flow region at a relatively cold temperature and the nozzles themselves are kept cold to assist in this result. The temperature throughout the supersonic flow region is low enough, approximately 100°K, so that chemical reactions between the gases are very slow. Thus, the gases can mix uniformly with negligible chemical reaction.

The supersonic flow zone is terminated by a shock wave which abruptly heats the gases. At the elevated temperature F atoms are produced by the initiating reaction, $$NO + F_2 \rightarrow NOF + F$$

and the emission-generating chain reactions proceed:

$$F + H_2 \rightarrow HF^{++} + H$$

$$H + F_2 \rightarrow HF^{++} + F$$

An an alternative, in the supersonic cold flow zone atoms can be made by an external trigger such as, for example, ultraviolet light, an electron beam, electric discharge, or the like, still retaining the conditions of essentially non-reacting mixing. The supersonic zone is then terminated by a shock wave as it enters a fixed reaction zone for extraction of laser power.

SPECIFIC DESCRIPTION OF THE INVENTION

Figure 1:
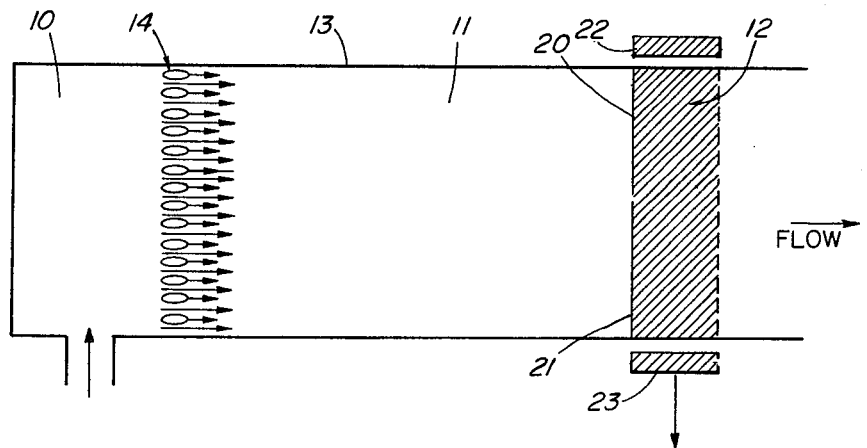
FIG. 1 is a schematic view of a laser according to one embodiment of the invention.

In FIG. 1 is illustrated schematically a laser system including a primary flow region 10 where the primary flow is introduced, a supersonic flow region 11 and reaction zone 12, all within a flow tube generally designated 13. Between the primary flow region 10 and the supersonic flow region 11 is a bank of supersonic expansion nozzles 14.

Figure 2:
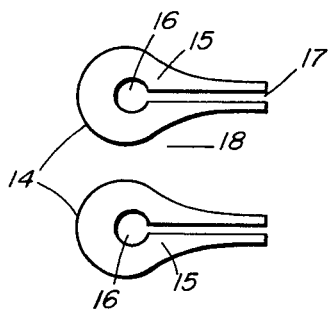
FIG. 2 is a schematic view of a bank of mixing nozzles according to the embodiment of FIG. 1.

The bank of nozzles 14 is further illustrated in FIG. 2 and comprises a plurality of nozzle members 15 having secondary gas feed channels 16 feeding into jet members 17 and a plurality of primary flow openings 18. Contoured expanding walls formed by nozzle members 15 are adapted to direct the primary gas into flow parallel with the jets 17 and thus with the secondary flow from jets 17. Consequently, the primary gas flow is introduced into supersonic flow region 11 between nozzle members 15, and mixes in the supersonic flow region 11 with secondary gas flow introduced through nozzle member 17.

At the opposite end of supersonic flow region 11 is a shock wave member 20 which establishes a shock wave, thereby abruptly terminating the supersonic flow region. The increase in temperature at the shock wave initiates the chemical reactions in zone 12, producing vibrationally excited HF. Mirrors 22 and 23 are positioned on opposite sides of the reaction region to extract laser power. Gas curtains 24 (see FIG. 3) are positioned to protect the mirror surfaces from the corrosive gases in the main flows.

As illustrated in FIG. 1, the primary flow gas is introduced into primary flow region 10 and passes between nozzles 15 to enter the supersonic flow region 11 and to mix therein with the secondary flow gas. The expansion nozzles 15 are maintained at low temperature, for example, at about 100°K., by circulating a cryogenic fluid around the nozzle assembly in conventional circulation means, not shown. The secondary flow gas enters the supersonic flow region 11 through nozzles 17 parallel with the primary gas. The gas in the supersonic flow region 11 is at a relatively low temperature, below about 125°K., and preferably at about 100°K., thereby arresting chemical reactions between the gases, and the low temperature is maintained in part by gas expansion and in part by the nozzles which are cooled by the cryogenic fluid.

Accordingly, in the supersonic flow region 11 the primary and secondary gases are introduced at a low temperature and mix uniformly while being kept relatively cold. The mixed gases then are abruptly heated at the shock wave member 20, whereupon the chemical chain reactions are initiated and laser action takes place in the reaction zone 12.

Figure 3:
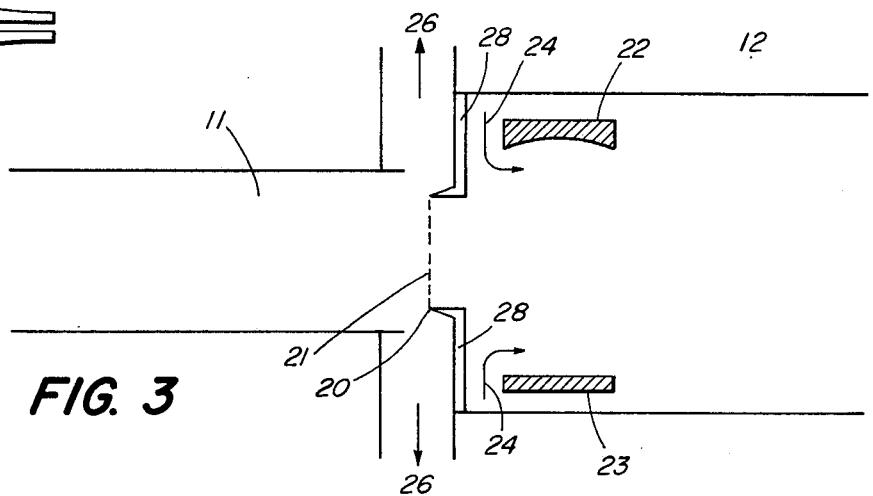
FIG. 3 is a schematic view of the shock holding region and the laser cavity of the embodiment of FIG. 1.

In FIG. 3 is shown the position of shock wave member 20 and of the shock wave 21. This member, which is called a shock holder in the art, is designed to establish a uniform stationary shock wave.

As illustrated, the primary flow region 11 is separated from the reaction zone 12 by a shock wave member or shock holder 20 formed by an annular or other restriction in a wall 28 partly separating region 11 from region 12. A secondary exhaust 26 is provided to scoop gas flow or boundary layer flow out of the shock wave area. Positioned behind wall 28 are mirrors 22 and 23 mounted in the usual manner to extract laser radiation from the reacting gas flow. Within the reaction zone 12 a flowing curtain of gas moves to sweep clean the mirror areas as indicated by arrows 24 directed across the surfaces of mirrors 22 and 23. As can be seen from this FIG. 3, the gas flow from supersonic flow region 11 meets a standing shock wave 21 at the junction between supersonic flow region 11 and reaction zone 12 and is partly scooped through the secondary exhaust 26 as it enters the reaction. At the shock wave 21, the gas pressure and temperature are abruptly raised and the gases enter reaction zone 12. The gas flow continues out the far end of the reaction zone.

OPERATION OF THE INVENTION

As is well known certain gases such as nitric oxide act as an initiator for the formation of atomic fluorine from molecular fluorine by the reaction

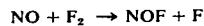

$$NO + F_2 \rightarrow NOF + F$$

Very little reaction occurs at the low temperatures prior to the shock wave and dissociated fluorine atoms are produced after the shock in the hotter reaction zone. The $HF^{++}$ producing chain reactions which require atomic fluorine or hydrogen are delayed until after the shock, because significant production of dissociated fluorine atoms does not take the place in the supersonic region 11. In the apparatus illustrated in FIGS. 1, 2 and 3 the primary gas, or mixture of He, $H_2$, and NO enters primary flow region 10 and expands to supersonic velocities as it passes through nozzles 14 and consequently cools to below 125°K. The secondary gas, or $F_2$, is injected into the cold supersonic flow at the end of nozzles 14. Because of the low temperature, the amount of chemical reaction is negligible in the supersonic flow region. The cold nozzles 14, generally in the range of about 100°K, maintain frozen chemistry in the gas that flows through the nozzle boundary layer, and the length of the supersonic flow is long enough to ensure uniformly mixing of the gas streams.

At the transition to subsonic flow across the shock the gas temperature and pressures increase, and chemical reactions proceed.

Specific flow velocities and pressures as such are controlled primarily to produce the desired temperatures and reaction rates. In general, a temperature of about 125°K or lower is desired in the supersonic flow region 11, and this is readily achieved by gas expansion at the bank of nozzles 14. At the shock wave 21 the temperature is sharply raised to a reaction temperature in the range of about 300°K. The supersonic flow temperature is quite low so that only negligible chemical reaction occurs in region 11 which may be in the general range of one meter, more or less, to produce good mixing of the gases.

According to another embodiment of the invention, HF chain reaction laser devices can use other types of initiation such as for example, electrical discharge, ultraviolet light photodissociation, or other externally initiated means instead of or with addition of chemical initiators such as $SF_6$ or the like. In a mixture of $F_2$, $H_2$, a buffer and $SF_6$, atoms can be found by dissociation brought about by electric energy to release F atoms capable of entering into the chain reaction. In a similar way certain hydrogen-containing gases can release H atoms.

Figure 4:
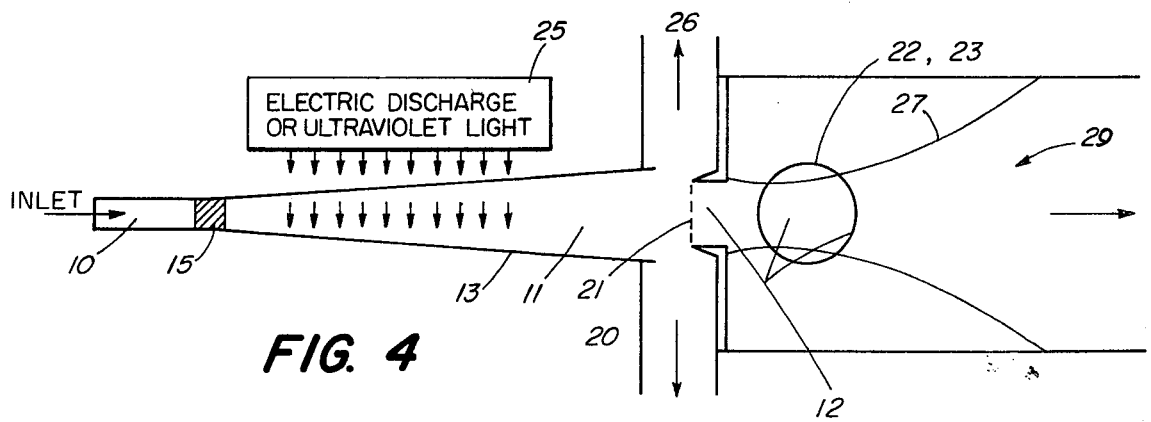
FIG. 4 is a schematic view of a laser according to another embodiment of the invention.

In FIG. 4 is shown a laser according to this embodiment, having a primary flow region 10, at least one expansion nozzle 15, and a supersonic flow region 11 in a flow tube 13. A shock wave 21 is a positioned at constructed wall 20 near the boundary between supersonic flow region 11 and reaction zone 12. An external initiation source 25 which may be an ultraviolet light source as shown or other initiator is positioned at the supersonic flow region and is adapted to initiate ion dissociation by means of such ultraviolet radiation, electric discharge, electric beam or the like. A chemical initiator such as NO is not required. An exhaust 26, is employed at the end of region 11 to scoop the boundary layer flow. Mirrors 22 and 23 are positioned across the reaction region to extract laser radiation.

In FIG. 4 is shown also a contoured exit for the gases after reaction and laser energy extraction. An exit orifice 29 is bounded by contoured exit walls 27 leading in smooth flow to an open, unrestricted orifice. A similar contoured exit in the apparatus in FIG. 3 is present but not shown because of a different directional view. In region 10 the first and second reaction gases are premixed with a buffer gas such as helium, argon or the like and expanded to low temperatures with the same supersonic nozzle or nozzles. Presently preferred ratios are about 10 to about 20 parts by volume of the buffer for each part by volume of each reaction gas. The temperature of the supersonic gas is in the range of about 100°K. In the supersonic region 11 and the reaction zone 12 the gas is dissociated by external means as indicated above. An ultraviolet light source 25 is shown, emitting a beam directed into flow region 11, being initiated by the external initiating means and triggered by the shock wave.

The system shown in FIG. 4 has several advantages, including stable flow at high laser efficiencies, operation at about atmospheric pressure after the shock, and laser beam operation in pulsed or CW mode as desired.

I claim:

1. A method of producing laser radiation from chemical reaction comprising:

providing a flow of a first reaction gas mixture comprising a first reaction gas and an initiator for a second reaction gas, providing a separate flow of a second reaction gas, said first reaction gas and said second reaction gas being reactive with each other to form a vibrationally excited product providing a flow of a noble gas buffer to one of said first reaction gas mixture and said second reaction gas, mixing said gases in a moving stream of supersonic flow at a temperature below the effective reaction temperature of said gases, establishing a shock wave in the path of flow of said mixed gases at a boundary between a supersonic flow region and a reaction zone, said shock wave being adapted to cause an abrupt increase in temperature of said gases, and extracting laser energy from said gases in said reaction zone.

2. The method of claim 1, wherein said first reaction gas is hydrogen and said second reaction gas is fluorine.

3. The method of claim 2, wherein said hydrogen is in the form of deuterium.

4. The method of claim 1 wherein said first gas and said second gas are adapted to react in a chain reaction.

5. A method of producing chemical laser radiation comprising:

providing a flow of a mixed first reaction gas and second reaction gas adapted to undergo a chemical reaction producing laser emission, maintaining said mixture in supersonic flow at a cold temperature below about 125°K to inhibit said reaction, initiating dissociation into reactive atoms corresponding to atoms from one of said gases, abruptly raising said temperatures to a reaction temperature by shock wave heating, and thereafter, extracting laser energy.

6. A chemical laser comprising:

a. means for mixing a first reaction gas mixture comprising a first reactive gas, a helium buffer and an initiator for dissociation of a second reaction gas, b. means to direct a first reactive gas, a buffer, and dissociation initiator for a second reactive gas to said means for mixing, c. gas expansion means adapted to expand said first reaction gas and direct it in a plurality of flowing jets in supersonic flow, and means to feed said first reaction gas to said gas expansion means, said expansion means being adapted to expand said gas to a temperature below about 125°K., d. a source of a second reaction gas and means to expand and direct said second gas between said jets of said first reaction gas mixture in supersonic flow at a temperature below about 125°K., e. a supersonic flow chamber to receive said flowing gases in supersonic flow and to bring about mixing thereof, f. a shock wave initiator at the end of said supersonic flow chamber, said shock wave initiator forming a boundary between said supersonic flow chamber and a reaction zone and adapted to abruptly raise said gas temperature, g. a reaction zone, and means at said reaction zone to extract laser energy from said gases.

7. The chemical laser of claim 6, wherein the first reactive gas is hydrogen and the second reaction gas is fluorine.

8. The chemical laser of claim 7, wherein the hydrogen is in the form of deuterium.

9. A method of producing continuous laser radiation comprising:

a. mixing a first chemical laser reactive gas, a buffer and a dissociation initiator for a second chemical laser reaction gas to form a first reaction gas mixture, b. expanding said mixture into a plurality of supersonic jets at a temperature of about 100°K., c. introducing a second chemical laser reaction gas between said jets, d. mixing said second gas with said jets in supersonic flow at a temperature of about 100°K., e. forming a shock wave in said mixed gases including said first reaction gas, said initiator and said second reaction gas to abruptly raise the temperature of said gases, and f. extracting laser energy therefrom.

10. The method of claim 9, wherein said first chemical laser reactive gas is hydrogen and said second chemical laser reaction gas is fluorine.

11. The method of claim 10, wherein said dissociation initiator is NO.

* * * * *